United States Patent [19]

LeGrand

[11] 4,216,433
[45] Aug. 5, 1980

[54] THRESHOLD CIRCUIT

[75] Inventor: Jesse S. LeGrand, Clifton, N.J.

[73] Assignee: International Telephone and Telegraph Corporation, New York, N.Y.

[21] Appl. No.: 869,391

[22] Filed: Jan. 13, 1978

[51] Int. Cl.² .................... H03D 3/00; H03K 17/12
[52] U.S. Cl. ................................ 328/111; 307/358; 307/265; 328/58; 343/17.2 PC
[58] Field of Search ............... 307/358, 266; 328/58, 328/65, 111, 116; 343/17 PC; 333/14

[56] References Cited

U.S. PATENT DOCUMENTS

| | | | |
|---|---|---|---|
| 3,896,433 | 7/1975 | Carre | 328/58 |
| 3,968,490 | 7/1976 | Gostin | 343/17.2 PC |
| 3,995,270 | 10/1976 | Perry et al. | 307/358 |
| 4,045,798 | 8/1977 | Carre | 328/58 |

Primary Examiner—Stanley D. Miller, Jr.
Assistant Examiner—B. P. DAvis
Attorney, Agent, or Firm—John T. O'Halloran; Alfred C. Hill

[57] ABSTRACT

There is disclosed a threshold circuit for a long coded pulse having a given amplitude subdivided into a plurality of chips, each providing a code bit. A first circuit receives the coded pulse to compress the coded pulse into a shorter pulse of much greater amplitude than the given amplitude and to detect the compressed pulse. A second circuit also receives the coded pulse, detects the coded pulse and provides an amplitude threshold voltage. A third circuit coupled to the first and second circuits produces a finite output when the amplitude of the compressed pulse is greater than the amplitude of the threshold voltage and a zero output when the amplitude of the compressed pulse is less than the amplitude of the threshold voltage.

15 Claims, 2 Drawing Figures

U.S. Patent  Aug. 5, 1980  4,216,433
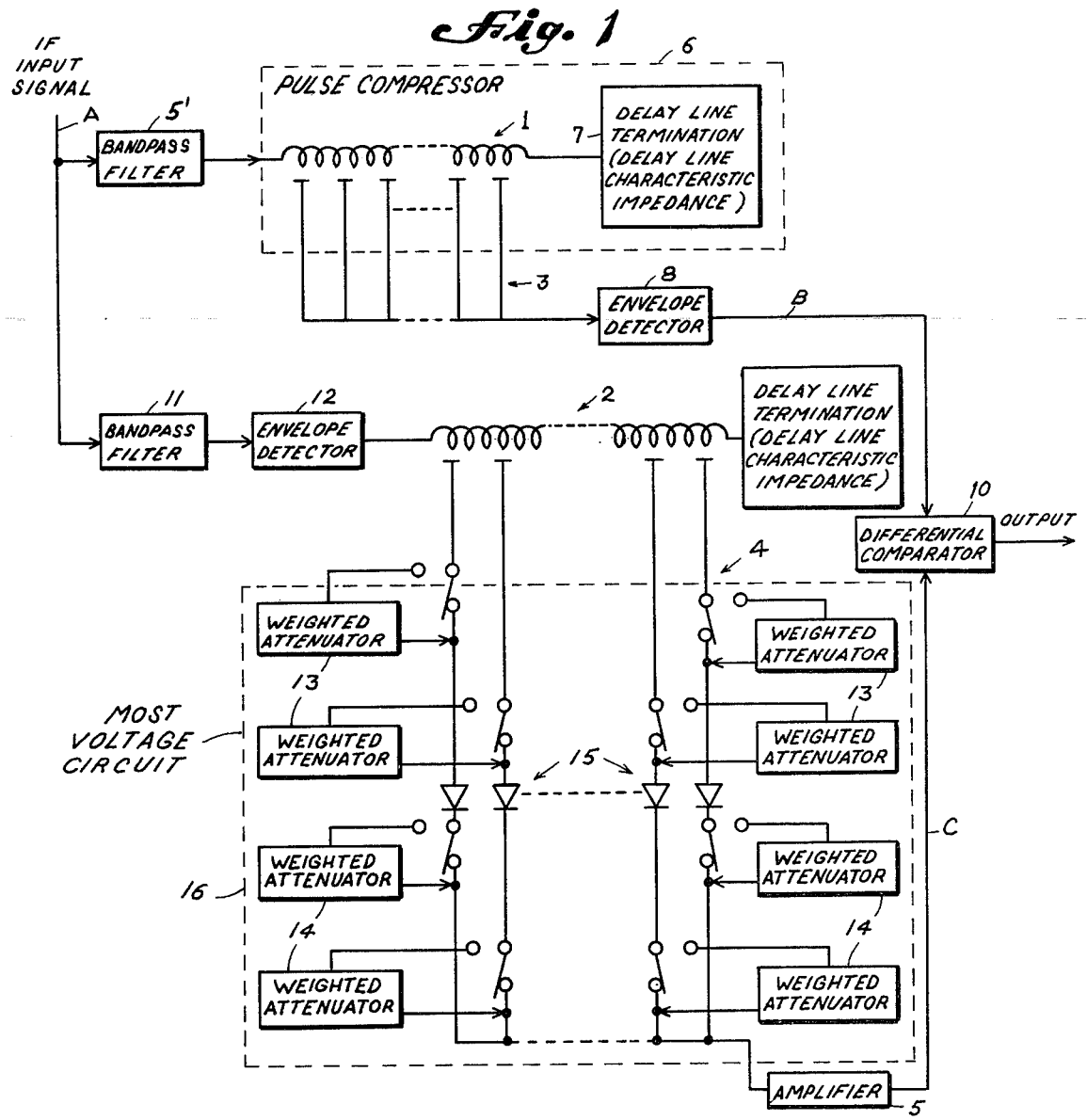
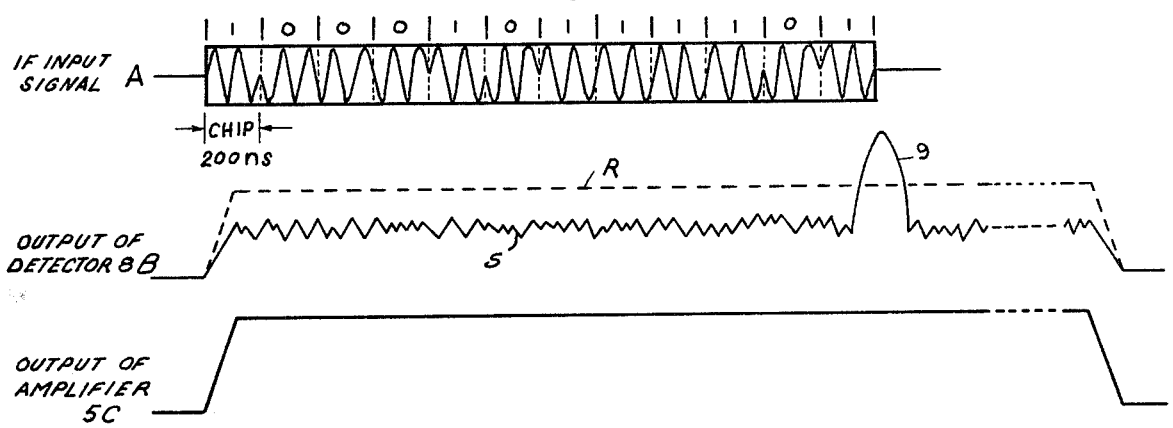

THRESHOLD CIRCUIT

BACKGROUND OF THE INVENTION

The present invention is related to pulse compression systems.

The term "chip" employed herein is a number of contiguous subpulses of a long pulse with each of the chips providing a code bit.

Pulse compression systems transmit a "long" pulse coded with phase and/or frequency changes, which can be discrete or continuous. At the receiving end a pulse compressor and detector coherently sums the various elements or chips of the transmitted "long" pulse into a "short" pulse of much greater amplitude. In radar, communication, navigation and other systems, it is frequently necessary to make a hard yes or no decision as to whether or not such a pulse was received.

In the prior art this decision was made with a pulse having N chips by providing N delay lines coupled in parallel to the input with their outputs being summed. The adjacent N delay lines had a length progressing from a one chip delay to an N chip delay. As can be seen this becomes a rather cumbersome system, particularly if N is a large number as is the usual case in pulse compression systems.

SUMMARY OF THE INVENTION

An object of the present invention is to provide an improved detector for the long coded pulse transmitted in pulse compression systems.

Another object of the present invention is to provide a threshold circuit that allows a hard yes or no decision to be made efficiently and accurately, when the transmitted signal is subject to interference, such as pulse jamming, Gaussian noise, etc.

A feature of the present invention is the provision of a threshold circuit for a long coded pulse having a given amplitude subdivided into a plurality of chips each providing a code bit comprising: an input for the coded pulse; first means coupled to the input to compress the coded pulse into a short pulse of much greater amplitude than the given amplitude and to detect the compressed pulse; second means coupled to the input to detect the coded pulse and to provide an amplitude threshold voltage; and third means coupled to the first and second means to produce a finite output when the amplitude of the compressed pulse is greater than the amplitude of the threshold voltage and a zero output when the amplitude of the compressed pulse is less than the amplitude of the threshold voltage.

BRIEF DESCRIPTION OF THE DRAWING

Above-mentioned and other features and objects of this invention will become more apparent by reference to the following description taken in conjunction with the accompanying drawing, in which:

FIG. 1 is a block diagram illustrating the threshold circuit in accordance with the principles of the present invention; and FIG. 2 is a timing diagram illustrating signals present at certain locations in the circuit of FIG. 1.

DESCRIPTION OF THE PREFERRED EMBODIMENT

For illustrative purposes the operation of the threshold circuit will be described as if the receive signal is a binary phase coded pulse. Typical codes are Barker and maximal length codes. These phase coded pulses consist of a number of contiguous pulses, known as chips. The pulse length is denoted as T and the number of chips as N. The waveforms shown in FIG. 2 are typical of phase coded pulse compression. The delay lines 1 and 2 have a length approximately the length of the coded pulse, the number of taps 3 and 4 is approximately equal to the number of chips and the gain of amplifier 5 is selectable for various modes. The circuit is not limited to binary phase coded pulse compression but is also applicable to chirp, frequency coded and coherent frequency shift keyed codes.

The incoming signal, after conversion to the appropriate intermediate frequency (IF), such as shown in Curve A of FIG. 2, is applied to bandpass filter 5 which in turn couples the input IF signal to pulse compressor 6 which includes as its main component delay line 1 terminated in the delay line termination 7 which has a characteristic impedance equal to the characteristic impedance of delay line 1. The taps 3 are loosely coupled and equally spaced along delay line 1. The output of taps 3 are coupled in common to an envelope detector 8 which provides at its output the solid line of Curve B. The output of detector 8, if it receives a desired long coded pulse, includes a pulse 9 whose width is T/N, consisting of the detected coherent sum of the chips in the input signal A. Pulse 9 is known as the main lobe. If the compressor 6 is lossless and the detector 8 is an envelope detector, the main lobe video output voltage will be N times the peak value of the IF input signal. In the interval $T/(N-1)$, preceding and following the main lobe 9, there will be responses of lesser amplitude known as side lobes. It is one of the objects of this invention to generate a threshold voltage for application to a differential comparator 10 which exceeds the detector 8 output except during the interval of main lobe 9.

The threshold voltage is generated as follows. The IF signal is passed through bandpass filter 11 to envelope detector 12 and then coupled to tapped delay line 2 which has a plurality of taps that are loosely coupled and equally spaced along delay line 2. The delay of delay line 2 is approximately that equal to the delay of line 1 or the long pulse of the IF signal of Curve A, FIG. 2. The number of taps 4 is approximately equal to the number of chips in the long coded pulse.

In some instances, it may be advantageous to weight the delay line 2 by installing attenuators on some of the taps 4. This is illustrated by attenuators 13 which are coupled directly to delay line 2 or weighted attenuators 14 coupled to diodes 15 through manipulation of the illustrated switches. If the weighted taps of delay line 2 were directly connected, it would be known as a transversal filter; however, diodes 15 are connected in series with each of the taps. This collection of diodes 15 or other similar one-way circuitry, is known as a most voltage circuit 16. With this arrangement, the voltage applied to a finite input impedance amplifier 5 is the greatest voltage appearing on any tap. The amplified "most voltage" is shown in Curve C of FIG. 2. The amplified "most voltage" is used as the threshold volage coupled to an input of differential comparator 10.

The dotted line in Curve B of FIG. 2 is the Curve C of FIG. 2 to illustrate that if the signal S is greater than the threshold voltage R, there will be a plus or binary "1" output, while if the signal S is less than the threshold voltage R there will be a zero or binary "0" output from comparator 10.

By optimizing the bandwidth of filters 5 and 11, the delay of delay lines 1 and 2, the number of taps 3 and 4 and the tap weighting by attenuators 13 or 14 and the gain of amplifier 5; maximum immunity to various types of jamming can be obtained, while establishing the desired false alarm rate, and ensuring maximum probability of detection of the long coded pulse.

The circuit operation just described was based on the pulse time of arrival being unknown. If the pulse time of arrival is known, improved operation can be obtained by allowing the signal and jamming to enter detector 12 only during the pulse arrival time.

While I have described above the principles of my invention in connection with specific apparatus it is to be clearly understood that this description is made only by way of example and not as a limitation to the scope of my invention as set forth in the objects thereof and in the accompanying claims.

I claim:

1. A threshold circuit for a long coded pulse having a given amplitude subdivided into a plurality of chips each providing a code bit comprising:
   an input for said coded pulse;
   first means coupled to said input to compress said coded pulse into a short pulse of much greater amplitude than said given amplitude and to detect said compressed pulse;
   second means coupled to said input to detect said coded pulse and to provide an amplitude threshold voltage; and
   third means coupled to said first and second means to produce a binary "1" output when the amplitude of said compressed pulse is greater than the amplitude of said threshold voltage and a binary "0" output when the amplitude of said compressed pulse is less than the amplitude of said threshold voltage.

2. A threshold circuit according to claim 1, wherein said first means includes
   a first bandpass filter coupled to said input,
   a first delay line means coupled to said first filter, said first delay line means having a length approximately as long as said coded pulse,
   a first plurality of taps loosely coupled to and equally spaced along said first delay line means, the number of said first taps being approximately equal to the number of said chips, and
   a first envelope detector coupled in common to said first plurality of taps.

3. A threshold circuit according to claim 2, wherein said second means includes
   a second bandpass filter coupled to said input,
   a second envelope detector coupled to said second filter,
   a second delay line means coupled to said second envelope detector, said second delay line means having a length approximately as long as said coded pulse,
   a second plurality of taps loosely coupled to and equally spaced along said second delay line means, the number of said second taps being approximately equal to the number of said chips,
   at least a plurality of diodes each coupled to a different one of said second taps, and
   an amplifier coupled in common to each of said plurality of diodes.

4. A threshold circuit according to claim 3, wherein said second means further includes
   a weighted attenuator coupled in series with predetermined ones of said plurality of diodes.

5. A threshold circuit according to claim 4, wherein said weighted attenuators are coupled between an associated one of said second plurality of taps and an associated one of said plurality of diodes.

6. A threshold circuit according to claim 4, wherein said weighted attenuators are coupled between an associated one of said plurality of diodes and said amplifier.

7. A threshold circuit according to claim 4, wherein said third means includes
   a differential comparator.

8. A threshold circuit according to claim 3, wherein said third means includes
   a differential comparator.

9. A threshold circuit according to claim 1, wherein said second means includes
   a bandpass filter coupled to said input,
   an envelope detector coupled to said filter,
   a delay line means coupled to said envelope detector, said delay line means having a length approximately as long as said coded pulse,
   a plurality of taps loosely coupled to and equally spaced along said delay line means, the number of said taps being approximately equal to the number of said chips,
   at least a plurality of diodes each coupled to a different one of said taps, and
   an amplifier coupled in common to each of said plurality of diodes.

10. A threshold circuit according to claim 9, wherein said second means further includes
    a weighted attenuator coupled in series with predetermined ones of said plurality of diodes.

11. A threshold circuit according to claim 10, wherein
    said weighted attenuators are coupled between an associated one of said plurality of taps and an associated one of said plurality of diodes.

12. A threshold circuit according to claim 10, wherein
    said weighted attenuators are coupled between an associated one of said plurality of diodes and said amplifier.

13. A threshold circuit according to claim 10, wherein said third means includes
    a differential comparator.

14. A threshold circuit according to claim 9. wherein said third means includes
    a differential comparator.

15. A threshold circuit according to claim 1, wherein said third means includes
    a differential comparator.

* * * * *